(No Model.)
P. LESSER.
GAS BURNER FOR HEATING PURPOSES.
No. 401,445. Patented Apr. 16, 1889.
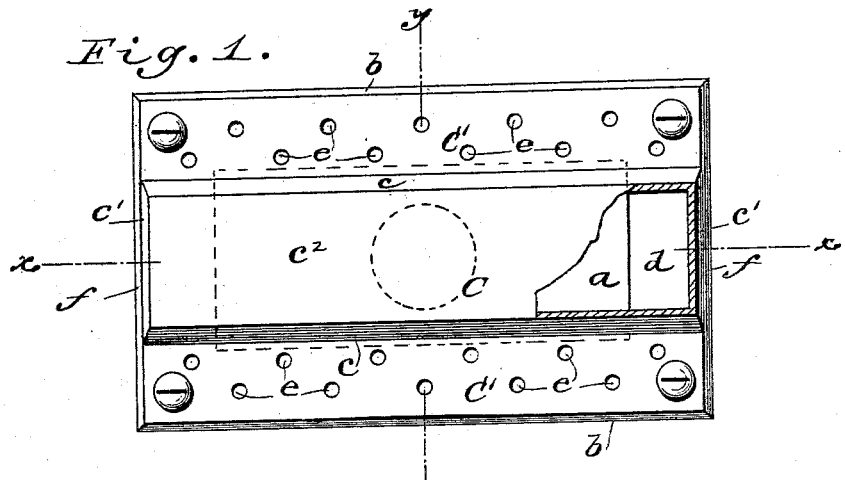
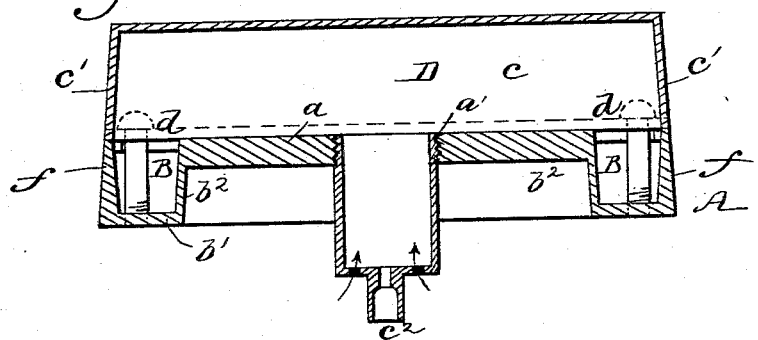
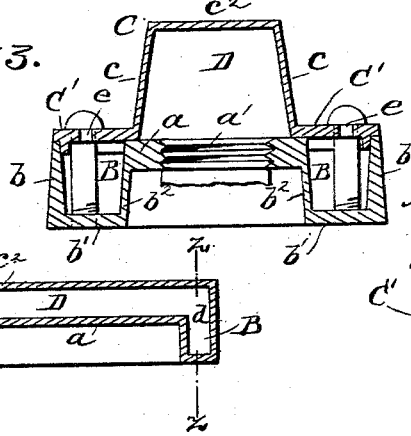
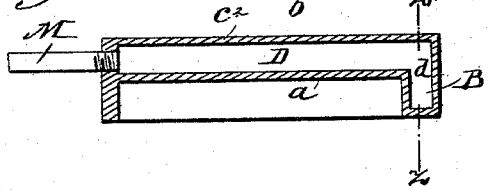
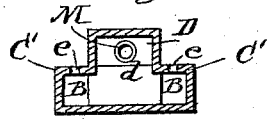
WITNESSES:
INVENTOR:
P. Lesser
BY Munn & Co.
ATTORNEYS.

UNITED STATES PATENT OFFICE.

PHILLIP LESSER, OF RIDGWAY, PENNSYLVANIA.

GAS-BURNER FOR HEATING PURPOSES.

SPECIFICATION forming part of Letters Patent No. 401,445, dated April 16, 1889.

Application filed August 7, 1888. Serial No. 282,173. (No model.)

*To all whom it may concern:*

Be it known that I, PHILLIP LESSER, of Ridgway, in the county of Elk and State of Pennsylvania, have invented a new and Improved Gas-Burner for Heating Purposes, of which the following is a full, clear, and exact description.

Reference is to be had to the accompanying drawings, forming a part of this specification, in which similar letters of reference indicate corresponding parts in all the figures.

Figure 1 is a broken plan view of my new burner. Fig. 2 is a longitudinal sectional elevation of the same on line $x\,x$ of Fig. 1. Fig. 3 is a transverse sectional view on line $y\,y$ of Fig. 1. Fig. 4 is a longitudinal sectional elevation showing a modification, and Fig. 5 is a transverse sectional view of the same on the line $z\,z$ of Fig. 4.

The invention will first be described in connection with the drawings, and then pointed out in the claims.

A represents a casting, formed with a central elevated platform, $a$, outer surrounding flanges or walls, $b\,f$, narrow floor $b'$, and inner walls, $b^2$, which support the elevated platform $a$ above the floor $b'$. The walls $b\,f\,b^2$ and the floor $b'$ form a narrow channel or chamber, B, surrounding the whole interior of the burner. The upper surface of the elevated platform $a$ is on the same level as the upper edges of the outer walls, $b\,f$, and upon them is bolted the cap-plate C, formed with side walls, $c\,c$, end walls, $c'\,c'$, and top wall, $c^2$, forming chamber D. At its longitudinal edges the cap-plate C is formed with the side flanges, $C'\,C'$, which cover the channel B, as shown clearly in Fig. 3, and which are perforated with numerous holes $e\,e$, through which the gas escapes from the channel B and from which it is burned. The flame is therefore each side of the elevated chamber D. The gas is admitted to this chamber above the elevated platform $a$ through an opening, $a'$, in said platform, in which a gas-pipe may be fitted. The gas becomes heated in the chamber D and expanded and mixed with air (see Figs. 2 and 3 of the drawings) and enters the surrounding channel B at $d\,d$ at the ends of the chamber D, the walls $c'\,c'$ matching with the walls $f\,f$ of the lower casting, A, to form the said passages $d$ for that purpose. In this heated and expanded state the gas issues from the perforations $e\,e$ along the sides and is burned, producing intense heat.

In Figs. 4 and 5 the gas enters the top chamber, D, through a pipe, M, at one end of the said chamber. The gas passes the whole length of the chamber D and descends to the channel B through passage $d$, from whence it rises through the perforations $e\,e$ and is burned.

Having thus described my invention, what I claim as new, and desire to secure by Letters Patent, is—

1. The gas-burner herein shown and described, constructed to form a top chamber to which the gas is first applied, an end passage leading from said top chamber downward, and side chambers or channels on a lower level than the top chamber and communicating therewith through said end passage, said side chambers being covered by perforated plates, substantially as described.

2. A gas-burner consisting in the raised bottom $a$, having a surrounding channel, B, around its sides and ends, the top of the channel being open, and the raised bottomless cap-plate C, resting at its lower longitudinal edges on the side edges of the bottom $a$ and with its end walls, $c'$, on the outer end walls, $f\,f$, of the chamber B to form the end passages, $d\,d$, and formed with the perforated side plates, $C'\,C'$, forming covers for the side of the channel B, the chamber D, formed by said cap-plate, being provided with a gas-inlet, substantially as set forth.

PHILLIP LESSER.

Witnesses:
 J. C. HARDING,
 PHILIP SCHIRK.